(12) United States Patent
Speece

(10) Patent No.: US 6,286,884 B1
(45) Date of Patent: Sep. 11, 2001

(54) TRUCK RAIL CAP SYSTEM

(75) Inventor: Donald R. Speece, Huntington Beach, CA (US)

(73) Assignee: Bull Associated Products, LLC, Huntington Beach, CA (US)

( * ) Notice: Subject to any disclaimer, the term of this patent is extended or adjusted under 35 U.S.C. 154(b) by 0 days.

(21) Appl. No.: 09/772,092

(22) Filed: Jan. 25, 2001

(51) Int. Cl.[7] .................................................. B60R 27/00
(52) U.S. Cl. ............................ 296/41; 296/39.2; 280/770
(58) Field of Search .............................. 296/41, 43, 39.1, 296/39.2, 32; 293/770; 410/106, 108, 109, 110, 112

(56) References Cited

U.S. PATENT DOCUMENTS

| D. 423,117 | 4/2000 | Chaney et al. . |
|---|---|---|
| 4,253,785 | * 3/1981 | Bronstein ............................. 410/110 |
| 4,909,559 | 3/1990 | Zettle . |
| 5,326,187 | 7/1994 | St. Marie et al. . |
| 5,470,642 | * 11/1995 | Egigian ........................... 296/39.1 X |
| 5,704,678 | 1/1998 | Elwell et al. . |
| 5,794,390 | 8/1998 | Oliveri et al. . |
| 5,823,601 | 10/1998 | Stanesic et al. . |

* cited by examiner

Primary Examiner—Stephen T. Gordon
Assistant Examiner—Jason Morrow
(74) Attorney, Agent, or Firm—Gene Scott-Patent Law & Venture Group

(57) ABSTRACT

A combination apparatus comprises a truck bed sidewall providing a horizontally oriented top bed wall portion and an integral downwardly extending inner, outer end portions, and a sidewall cover providing a horizontally oriented top cover portion and integral therewith and extending downwardly therefrom, an inner, outer and end cover portions dimensionally sized to fit over the truck sidewall with the corresponding top, side and end portions in surface to surface contact. The sidewall cover comprises plural sections arranged in linear mutually abutting sequence defining at least one section interface between sections. The interface comprises a pair of complementary mutually interengagable U-shaped edges wherein a first one of the U-shaped edges provides an extending lip and a second one of the U-shaped edges provides a recessed lip, the recessed lip receiving the extending lip in overlapping abutment.

5 Claims, 4 Drawing Sheets

TRUCK RAIL CAP SYSTEM

BACKGROUND OF THE INVENTION

1. Field of the Invention

This invention relates generally to protective cover devices and more particularly to a system for covering the tops of the sides of a pickup truck in such a manner as to be self adjusting.

2. Description of Related Art

The following art defines the present state of this field: Chaney et al, U.S. Pat. No. D423,117 describes a deck railing cap extrusion.

Zettle, U.S. Pat. No. 4,909,559 describes an apparatus for protecting the upper portions of the side walls of a vehicle cargo bed. The apparatus includes an elongate body having a medial section, a first end, and a second end, both ends extending downwardly from the medial section. The first end includes a magnet system, which enables its attachment to a vehicle bed wall without mechanical fasteners. The second end includes a hook member adapted to engage the ledge portion normally found in most vehicle cargo beds. The entire apparatus is preferably of one-piece construction, and manufactured of rubber. It also includes a flexible joint between the first end and medial section to facilitate use of the apparatus with walls of different thickness. Finally, the top of the medial section includes a plurality of longitudinally extending ribs designed as shock absorbers for any cargo or objects positioned thereon.

St. Marie et al., U.S. Pat. No. 5,326,187 describes a cover to cover the upper rail of a railing. The upper rail has a top, bottom and side. The cover has a curved top with a concave inner surface to be positioned adjacent the top of the rail. The longitudinal ribs on the inner surface. The side walls to be positioned adjacent the sides of the upper rail. There are flanges on the bottom of the side walls to contact the bottom of the rail to locate the cover on the rail.

Elwell et al., U.S. Pat. No. 5,704,678 describes a protective cap for covering the side walls of a pickup truck bed. The caps have a contour matching the contour of the side walls so as to provide a close fit, without the use of spacers or shims. The cap includes an elongated body with opposite forward and rearward ends and opposite inside and outside edges. Inside and outside lips are formed by bending portions of the respective inside and outside edges of the body downwardly. A notch is provided adjacent the rearward end of the body, to permit a rearward lip to be formed by bending a portion of the rearward end downwardly. The formation of the outside and rear lips closes the gap. The outside lip and rear lip are joined by a weld which fills the closed notch so as provide a continuous curved surface at the rearward corner of the body. The weld is polished to be visually indistinguishable from the outside and rear lips. When the cap is mounted upon a side wall of the truck, the outside and rear lips overlapingly mate with the curved rearward end of the side wall.

Oliveri et al., U.S. Pat. No. 5,794,390 describes a structural covering that is attachable to a rail of a railing that has a top, a pair of sides, ends, and a bottom, and that is attachable to a floor board of a deck that has a top, a pair of sides, ends, and a bottom, while covering most of the rail of the railing and any exposed ends thereof and covering most of the floor board of the deck and any exposed ends thereof so as to prevent splinters, hide knots, splintered wood, discolored wood, and cracks in the wood, and give a uniform look that will not rot. The structural covering includes a general covering component, a connecting component, an end cap component, and a corner component. The general covering component covers most of the floor board of the deck and covers most of the rail of the railing. The connecting component joins facing ends of the general covering components that are adjacent and collinearlly-aligned. The end cap component covers any exposed end of the rail of the railing and any exposed end of the floor board of the deck and any free ends of the general covering component. And, the corner component joins facing ends of the general covering components that are adjacent and not collinearlly-aligned.

Stanesic et al., U.S. Pat. No. 5,823,601 describes a bed rail cover for mounting to and protecting a vehicle bed rail. The bed rail cover is comprised of an integrally formed elongated rail cover having a top wall and two opposing side walls that are shaped to substantially conform to the exterior of the bed rail, and a fastening means for securing the rail cover to the bed rail about a stake hole pocket in the bed rail. In a preferred embodiment, a fastening clip having opposing wings is inserted through the rail cover and into a stake hole pocket, the wings being yieldably biased against the stake hole pocket to secure the rail cover in place. The fastening clip allows the rail cover to expand and contract in a longitudinal direction to prevent cracking and bulging of the rail cover.

The prior art teaches the use of protective rail-type covers for a vehicle cargo bed and for a fence, but does not teach a segmented multi-part cover with interengaging features capable of overcoming thermal expansion and contraction problems. The present invention fulfills these needs and provides further related advantages as described in the following summary.

SUMMARY OF THE INVENTION

The present invention teaches certain benefits in construction and use which give rise to the objectives described below.

The invention is a combination apparatus comprising a truck bed sidewall with a horizontally oriented top bed wall portion and integral downwardly extending inner, outer and end portions, and a sidewall cover providing a horizontally oriented top cover portion and integral therewith, and extending downwardly therefrom, an inner, outer and end cover portions, dimensionally sized to fit over the truck sidewall with the corresponding top, side and end portions in surface to surface contact. The sidewall cover comprises plural sections arranged in linear mutually abutting sequence defining at least one section interface between sections. The interface comprises a pair of complementary mutually interengagable U-shaped edges wherein a first one of the U-shaped edges provides an extending lip and a second one of the U-shaped edges provides a recessed lip, the recessed lip receiving the extending lip in overlapping abutment. The lips are designed with a length enabling the expansion of the parts, or the parts mounted upon without showing a gap between segments.

A primary objective of the present invention is to provide an apparatus and method of use of such apparatus that provides advantages not taught by the prior art.

Another objective is to provide such an invention capable of protecting the sidewall of a truck bed.

A further objective is to provide such an invention capable of linear thermal expansion and contraction without buckling or gapping.

A still further objective is to provide such an invention capable of covering a sidewall while still enabling the use of tie-down devices built into the truck sidewall.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
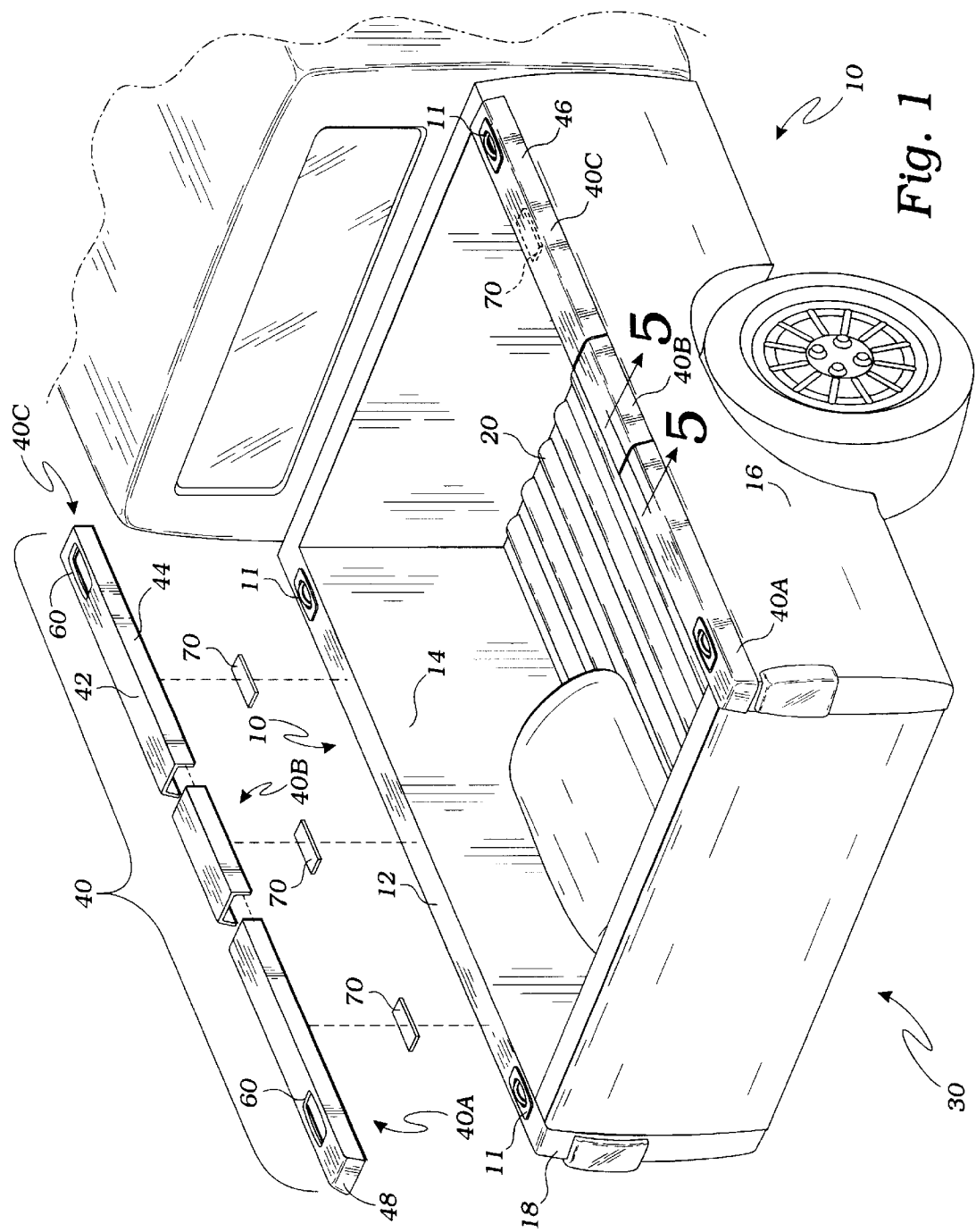
FIG. 1 is a perspective view of a truck showing a protective rail covering system of the preferred embodiment of the invention.

The present invention is a combination apparatus. One element of the combination is a truck bed sidewall 10 as shown in FIG. 1. This sidewall 10, typical of open bed trucks, provides a horizontally oriented top bed wall portion 12 and integral therewith and extending downwardly therefrom, an inner bed wall portion 14, an outer bed wall portion 16, an end bed wall portion 18, all typically made of sheet steel of a structural gauge and welded for rigidity. Such truck sidewalls 10 may take considerable abuse in loading and unloading cargo into the bed 20 of the truck 30. For this reason, and for improved appearance it is known to place a cover over the sidewall 10. The cover is typically made of a tough molded plastic material for absorbing shocks without scratching or denting.

In keeping with this practice, a further element of the combination of the present invention is just such a cover, defined herein as a sidewall cover 40 providing a horizontally oriented top cover portion 42 and integral therewith and extending downwardly therefrom, an inner cover portion 44, an outer cover portion 46, an end cover portion 48, the sidewall cover 40 is preferably dimensionally sized to fit tightly over the truck sidewall 10 with corresponding top 12, 42, side 14, 16, 44, 46 and end 18, 48 portions in near surface-to-surface contact. This arrangement allows the metal sidewall 10 to support loads, while the cover 40 provides shock absorption and improved sliding contact with load surfaces coming into contact with the sidewall cover 40, an admirable combination.

Figure 2:
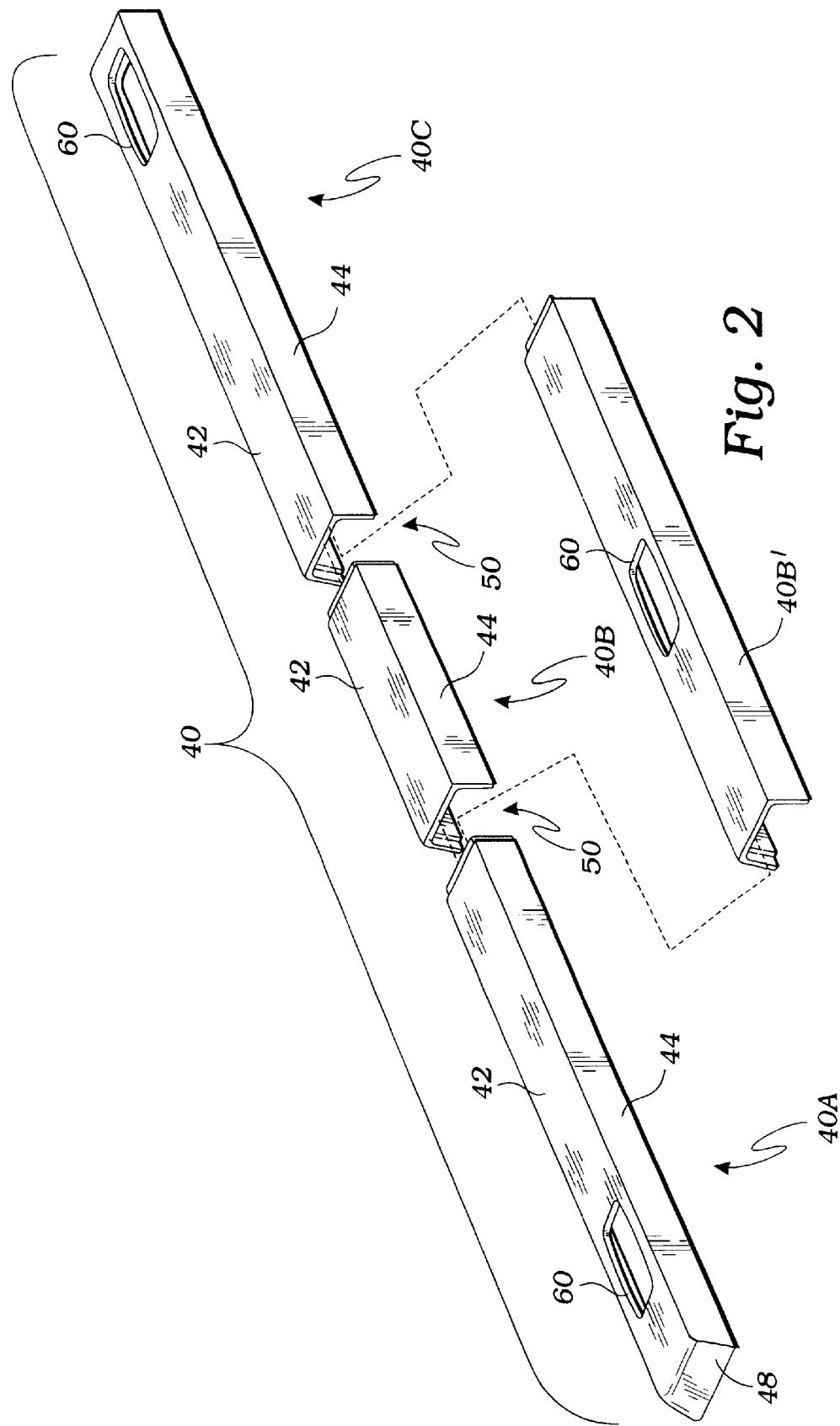
FIG. 2 is an exploded perspective view thereof.
Figure 3:
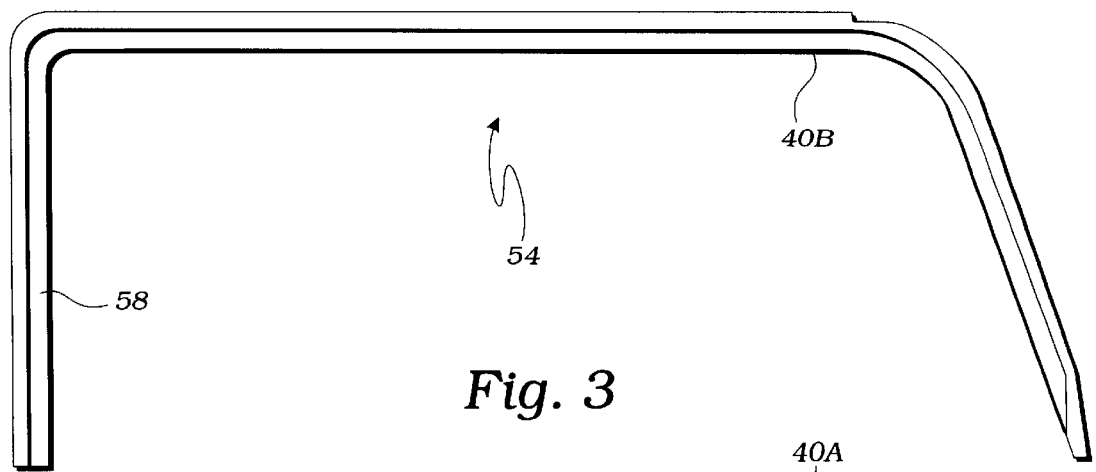
FIG. 3 is an end elevational view of a first portion of the protective rail system thereof.
Figure 4:
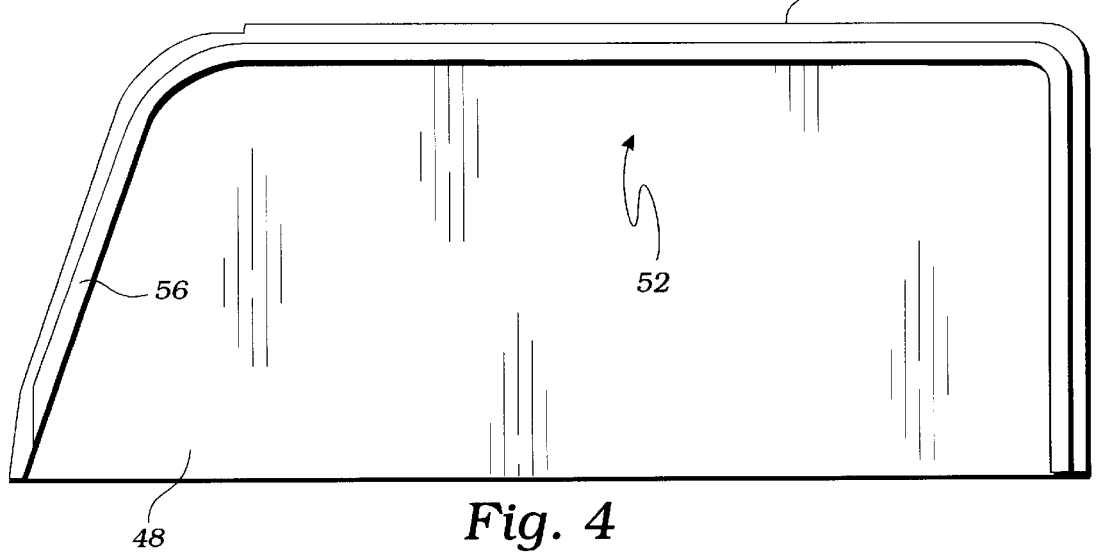
FIG. 4 is an end elevational view of a second interlocking portion of the protective rail system thereof.
Figure 5:
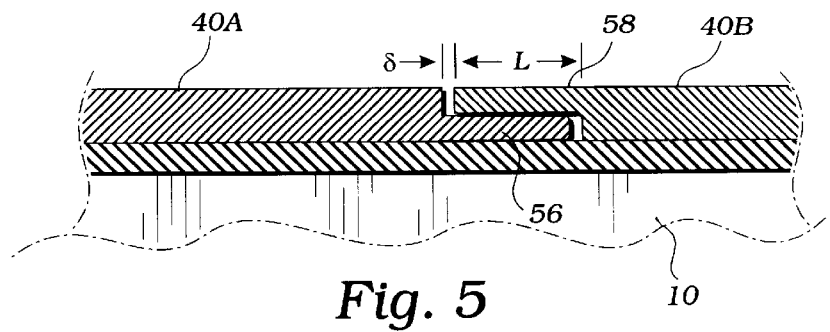
FIG. 5 is a sectional view taken along line 5—5 of FIG. 1.
Figure 6:
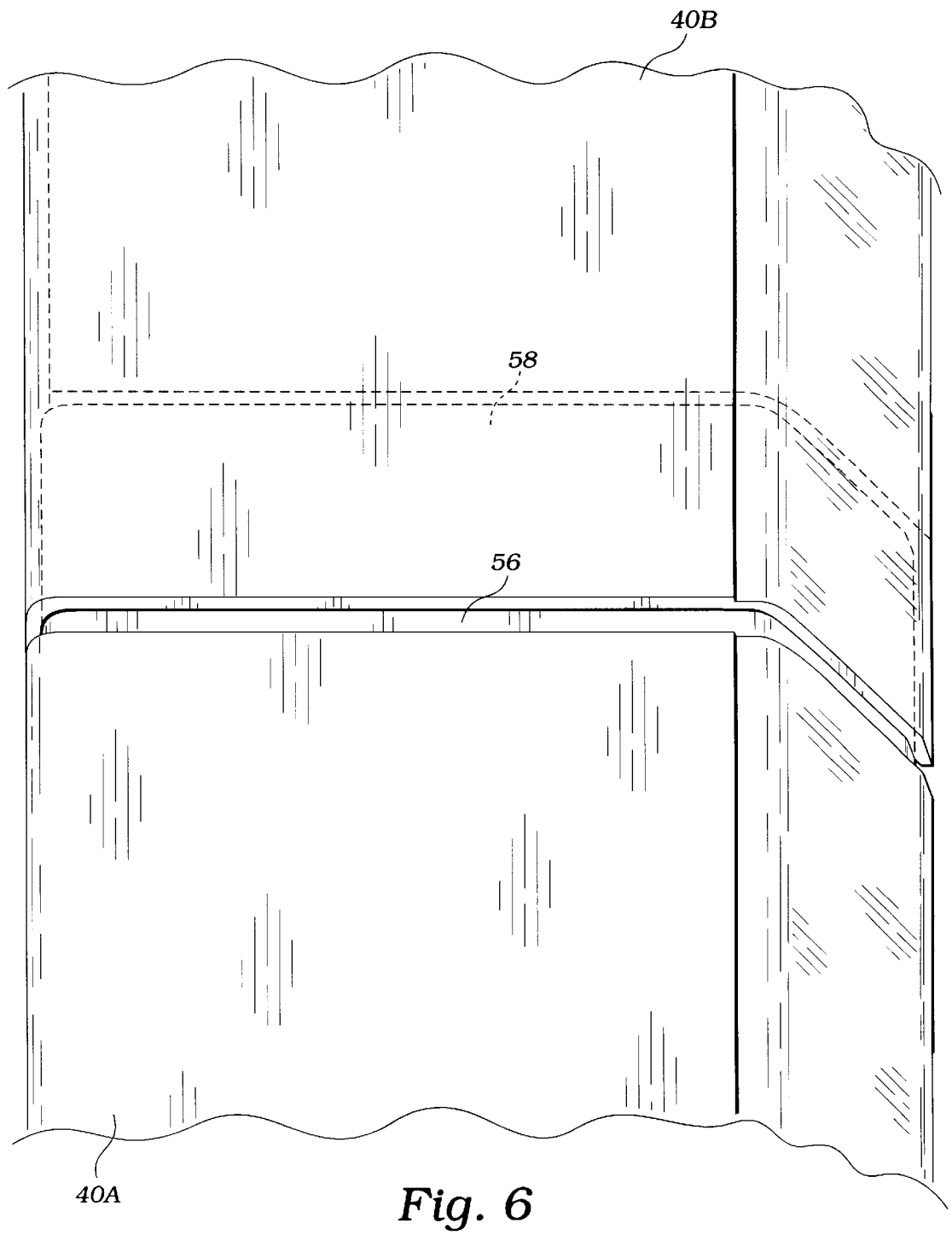
FIG. 6 is a partial top perspective view of the interlocking portions thereof.

The sidewall cover 40 of the present invention comprises plural sections 40A, 40B and 40C, arranged in linear mutually abutting sequence as shown in FIG. 2. The interface 50 between each of the sections includes a pair of complementary mutually interengagable U-shaped edges 52, 54 wherein a first one 52 of the U-shaped edges provides an extending lip 56 and a second one 54 of the U-shaped edges provides a recessed lip 58, the recessed lip 58 receiving the extending lip 56 in overlapping abutment, as best seen in the end views of FIGS. 3 and 4 and the plan view of FIG. 6.

At least one of the sidewall cover sections may provide an aperture 60 on the top cover portion 42 positioned for enabling access to a tie-down device 11 of the truck bed sidewall 10.

Preferably, the sidewall cover 40 further provides a means for fastening 70 the sidewall cover 40 to the truck bed sidewall 10 wherein such fastening means may be at least one bilateral adhesive strip as is well known in the art. Such strips have a foam or other flexible plastic material body and are covered on two opposing surfaces with an adhesive. Thus such strips may be placed between, and used to join the sidewall cover 40 to the sidewall 10 while allowing a small amount of mutual slippage or motion due to thermal expansion and contraction. These thermal influences are important in that a truck may be used in subzero as well as triple digit temperatures so that, depending upon the thermal coefficient of expansion of the particular material, the dimensional changes between the metal sidewall 10 and the cover 40 may be quite significant over the length of a typical truck bed. For a long-bed truck, dimensional changes may be 0.025 inches or more. Such physical changes may easily cause a cover to buckle under the stress and such results are not uncommon with conventional covers.

The subject sidewall cover 40 is installed in multiple sections 40A, 40B and 40C, as previously discussed. This allows the separate sections to move with the metal sidewall 10 as it thermally extends/contracts. In order to accommodate this, yet not allow a visible gap to occur between the abutting sections 40A, 40B or 40B, 40C, the overlapping lips are of a length "L" defined as greater than the maximum thermally related movement "∂."

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A combination apparatus comprising:

a truck bed sidewall providing a horizontally oriented top bed wall portion and integral therewith and extending downwardly therefrom, an inner bed wall portion, an outer bed wall portion, an end bed wall portion;

a sidewall cover providing a horizontally oriented top cover portion and integral therewith and extending downwardly therefrom, an inner cover portion, an outer cover portion, an end cover portion, the sidewall cover dimensionally sized to fit over the truck sidewall with corresponding top cover, side cover and end cover portions in close proximity to the top bed wall, side bed wall and end bed wall portions of the truck bed sidewall respectively;

the sidewall cover comprising plural sections arranged in linear mutually abutting sequence defining at least one section interface between sections; and the at least one interface comprising a pair of complementary mutually interengagable U-shaped edges wherein a first one of the U-shaped edges provides an extending lip and a second one of the U-shaped edges provides a recessed lip, the recessed lip receiving the extending lip in overlapping abutment.

2. The apparatus of claim 1 wherein at least one of the sidewall cover sections provides an aperture on the top cover portion positioned for enabling access to a tie-down device of the truck bed sidewall.

3. The apparatus of claim 1 further providing a means for fastening the sidewall cover to the truck bed sidewall.

4. The apparatus of claim 3 wherein the fastening means is at least one bilateral adhesive strip.

5. The apparatus of claim 1 wherein the extending lip is unbroken over the lateral extent of the U-shaped edge of the sidewall cover and of a length such that thermally induced length changes of the plural sections does not produce a visible gap between sections.

\* \* \* \* \*